United States Patent
Zhang et al.

(10) Patent No.: US 9,201,860 B1
(45) Date of Patent: Dec. 1, 2015

(54) SYSTEM AND METHODS FOR DETERMINING SENTIMENT BASED ON CONTEXT

(71) Applicants: Guangsheng Zhang, Palo Alto, CA (US); Chizhong Zhang, Palo Alto, CA (US)

(72) Inventors: Guangsheng Zhang, Palo Alto, CA (US); Chizhong Zhang, Palo Alto, CA (US)

( * ) Notice: Subject to any disclaimer, the term of this patent is extended or adjusted under 35 U.S.C. 154(b) by 279 days.

(21) Appl. No.: 13/794,797

(22) Filed: Mar. 12, 2013

(51) Int. Cl.
*G06F 17/27* (2006.01)

(52) U.S. Cl.
CPC .................................. *G06F 17/274* (2013.01)

(58) Field of Classification Search
None
See application file for complete search history.

(56) References Cited

U.S. PATENT DOCUMENTS

| | | | |
|---|---|---|---|
| 7,930,302 B2 | 4/2011 | Bandaru et al. | |
| 8,346,702 B2 * | 1/2013 | Busch et al. | 706/46 |
| 8,346,756 B2 * | 1/2013 | Polanyi et al. | 707/711 |
| 2011/0313757 A1 * | 12/2011 | Hoover et al. | 704/9 |
| 2012/0245923 A1 * | 9/2012 | Brun | 704/9 |
| 2013/0097174 A1 * | 4/2013 | Polanyi et al. | 707/742 |
| 2013/0173254 A1 * | 7/2013 | Alemi | 704/9 |
| 2014/0019399 A1 * | 1/2014 | Busch et al. | 706/46 |
| 2014/0188457 A1 * | 7/2014 | Fink et al. | 704/9 |
| 2014/0188459 A1 * | 7/2014 | Fink et al. | 704/9 |
| 2014/0272914 A1 * | 9/2014 | Baraniuk et al. | 434/362 |
| 2014/0278365 A1 * | 9/2014 | Zhang et al. | 704/9 |
| 2014/0279727 A1 * | 9/2014 | Baraniuk et al. | 706/11 |
| 2014/0316768 A1 * | 10/2014 | Khandekar | 704/9 |

* cited by examiner

*Primary Examiner* — Satwant Singh

(57) ABSTRACT

System and methods are disclosed for determining the connotation or sentiment type of a text unit comprising multiple terms and with a grammatical structure, such as subject+verb, verb+object, adjective+noun, noun+noun, noun+preposition+noun. The connotation or sentiment type of the text unit is determined by applying context rules where the context of the grammatical structure may change the inherent or default connotations of individual terms in the text unit. The methods provide a solution to the challenge of correctly or accurately determining the sentiment type of various linguistic structures under different context, and to the simplistic approach of using the inherent connotation of individual terms for the linguistic structure containing such terms.

20 Claims, 11 Drawing Sheets

Sentiment Analysis with Python NLTK Text Classification

This is a demonstration of sentiment analysis using a NLTK 2.0.4 powered text classification process. It can tell you wh the text you enter below expresses positive sentiment, negative sentiment, or if it's neutral. Using hierarchical classif *neutrality* is determined first, and *sentiment polarity* is determined second, but only if the text is not neutral.

Analyze Sentiment

Language: english

Enter text:
the price is pretty high

Enter up to 50000 characters

[Analyze]

Sentiment Analysis Results

The text is pos

The final sentiment is determined by looking at the cla probabilities below.

Subjectivity
- neutral: 0.2
- polar: 0.8

Polarity
- pos: 0.6
- neg: 0.4

Figure 9

SYSTEM AND METHODS FOR DETERMINING SENTIMENT BASED ON CONTEXT

BACKGROUND OF THE INVENTION

In sentiment or opinion analysis, conventional approaches and applications currently in the market often produce too many incorrect results, partly due to the complexity in human language communications. One apparent problem with many conventional approaches is that words or phrases in user expressions are looked at without sufficient contextual analysis, due to the difficulties in performing such analysis and the lack of advanced natural language technologies.

For example, in identifying the sentiment type of the expression "Their price is pretty high", many approaches may only look at the individual words in isolation, and identify the expression as reflecting a positive sentiment due to the presence of the word "pretty", without also looking at the context of the word "pretty", or without understanding the relationships between the words "price" and "high", and between "pretty and "high". Many systems also highlight words or phrases that are perceived to have either a positive or negative opinion or sentiment type for the purpose of better information presentation. However, without more advanced technologies and methods, the quality of the results is generally not up to the expectations yet, and the accuracy can often be too low to serve practical purposes.

Many words or phrases in a language carry positive or negative or neutral connotations, and can be used to express an opinion or feeling. For example, the word "good" usually carries a positive opinion, and the word "bad" usually carries a negative opinion. However, user expressions as linguistic units are not simple collections of individual words, and words or phrase that can carry either positive or negative opinions are not limited to such simple words like "good" or "bad". Meanings or information carried in natural language contents have internal structures, and most of the time, the inherent meanings of individual words or phrase are changed in various context.

For example, to many users of the English language, the word "high" has an inherent positive connotation to a certain degree, such as when used in expressions like "the quality is high", and the word "low" has an inherent negative connotation to a certain degree, such as when used in expressions like "the quality is low". However, the inherent connotations of being either positive or negative can have an opposite manifestation under a different context. For example, in expressions like "high price", the connotation of the phrase is usually perceived as being negative even though the word "high" has a positive inherent connotation or opinion type, as well as in other expressions like "high blood pressure", or "high cholesterol", etc.

Other more intriguing examples of different contexts changing the inherent connotations of a word or phrase can include expressions with the English word "prevent" or "prevention". When used alone, such as in the name of a magazine named "Prevention", or in expressions such as "prevent the disease", the word "prevent" or "prevention" carries a positive connotation or meaning. However, there are cases where these words are used in different context such as in "The lack of resources prevented them from making timely progresses", or "That condition prevented them from benefiting from the new policies", etc.

Conventional approaches in sentiment analysis are not able to handle such contextual changes of opinion types or connotations. One example of such a problem with the conventional approach is exhibited when using an open source natural language processing tool kit such as NLTK (http://text-processing.com/demo/sentiment). At the time of this writing, the output of the tool kit for expressions like "the price is pretty high", etc, consistently produce an opinion type of being positive, most likely due to the assumed positive connotation of the word of "high" or "pretty", as is shown in FIG. 9. In a commercially available website (http://www.lexalytics.com/web-demo) where a sentiment analysis demo is available, the analysis for the same expression produced the same results, as is shown in FIG. 10. Furthermore, conventional approaches are often limited to a dictionary lookup method to retrieve the default sentiment type of a word or phrase and then use them as is in different expressions. Such conventional approaches are generally unable to perform the contextual analysis to accurately determine the true connotations or sentiment type of the expressions being analyzed due to the complexity of the internal structures of linguistic expressions.

SUMMARY OF THE INVENTION

The present invention provides a system and methods for conducting contextual analysis of linguistic expressions to determine the contextually appropriate connotations or opinion or sentiment types of various user expressions.

In a general aspect, grammatical attributes that are associated with terms in a text unit are identified. The text units are a linguistic structure comprising two or more terms forming certain grammatical relationships. The grammatical attributes can include the grammatical roles of a term such as a subject, an object, a head of a phrase, a modifier of a phrase head, etc., and their parts of speech including a noun, a verb, an adjective, adverb, a preposition, etc.

In addition to grammatical attributes, the default or inherent connotations of the terms associated with an opinion, or sentiment type, are identified. Depending on the specific context and the types of the linguistic structures in the text unit, various algorithmic rules are defined for the determination of the resulting connotation or sentiment type of the text unit as a whole given the grammatical attributes and the default connotation of the terms in the text unit.

In another general aspect, terms in a language are organized into groups based on their semantic or conceptual attributes or characteristics. Contextual rules are defined for determining the connotation of the text unit as a whole based on the group memberships of the terms in the text unit, as well as the default connotations associated with the terms.

BRIEF DESCRIPTION OF THE DRAWINGS

FIG. 9 is a screenshot of an open-source natural language processing web site showing a demo result using an approach in the current market.

DETAILED DESCRIPTION OF THE INVENTION

In a general embodiment, grammatical analysis is first performed to identify the grammatical attributes and relationships between the words or phrases in a user expression or in a text content in general. And semantic attributes such as the inherent or default connotations or sentiment type of the words or phrase are obtained, and the connotations or sentiment type of the expression as a whole is then identified based on the grammatical or semantic attributes of the words or phrase in the expression, and their relationships.

Figure 1:
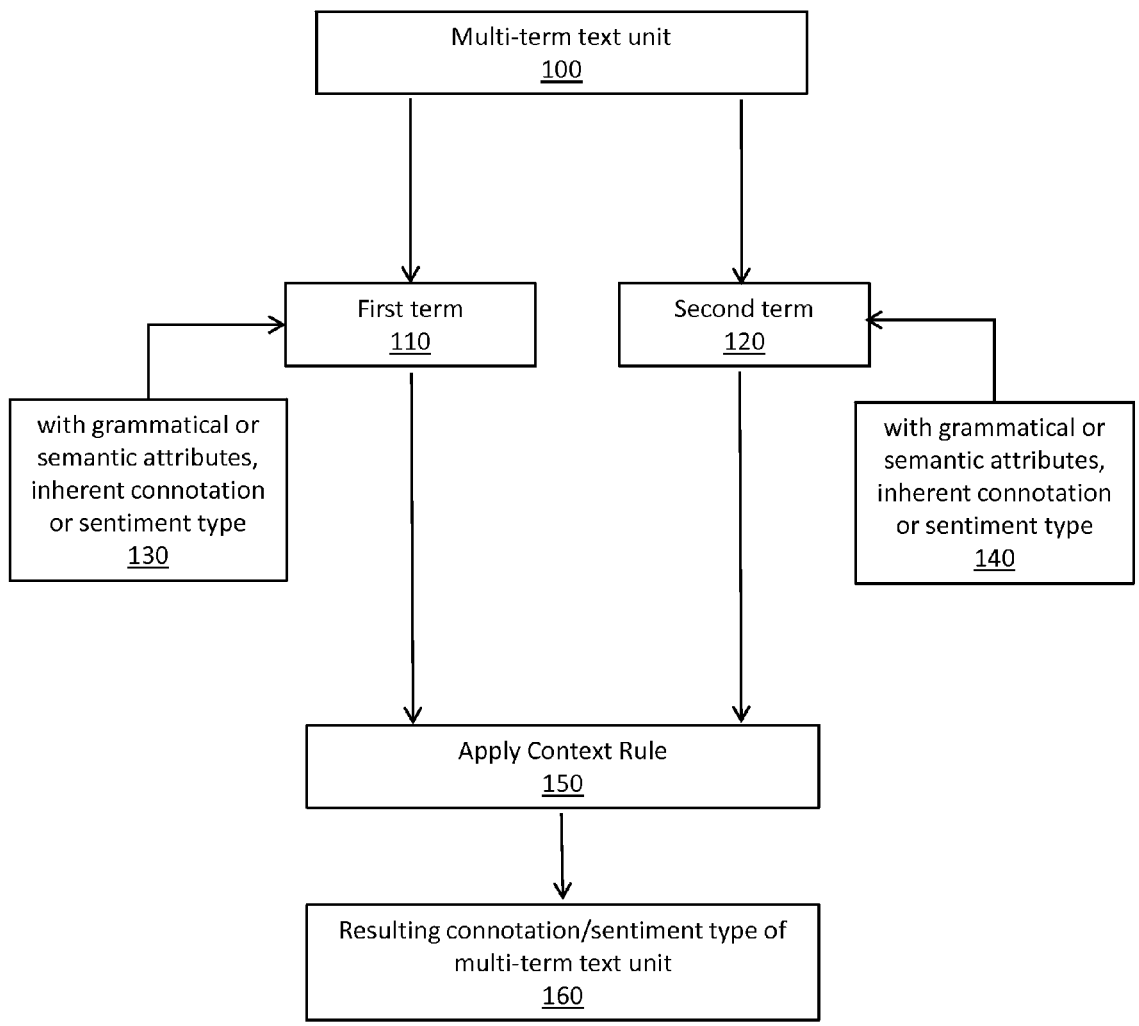
FIG. 1 illustrates a general overview of one embodiment of the present invention.

FIG. 1 illustrates a general overview of one embodiment of the present invention. A multi-term text unit 100 containing two or more terms is first obtained. A term in a text unit can be a word, or a phrase containing more than one word, and in some cases, it can also be a sentence. Text unit 100 can be extracted from various sources, including web pages, documents on a computer, advertisements, email, status updates and messages on a social networking site, user reviews on products or services, etc. After a multi-term text unit is obtained, the present invention extracts a first term 110 and a second term 120. Grammatical and semantic attributes associated with the terms are identified. Such information can usually be obtained from dictionary lookup, or from syntactic or semantic analysis. Such information or attributes include whether a term is a verb or a noun, or a subject or an object, etc., and whether the term carries an inherent positive or negative or neutral connotation or sentiment type, etc., as is shown in 130 and 140. Then, a context rule 150 is applied based on the grammatical or semantic attributes, and a resulting connotation or sentiment type 160 for the multi-term text unit is produced by the rule, and can be output for display or further analysis or reports.

In one embodiment, a text unit comprising at least two terms are identified as the unit for analysis.

Then, grammatical attributes such as the grammatical roles of whether a term is a subject of a sentence, or an object of the sentence or a verb, and whether a term is a modifier of another term in a phrase, or a term as a head of a phrase being modified by other term, etc., are identified. Parts of speech associated with each term are also identified. Parts of speech include whether a term is a noun, or a verb, or an adjective, an adverb, a preposition, or conjunction, auxiliary, determiner or article, etc.

Some conventional approaches use the grammatical negation element or negator in a language as a piece of context information to change the contextualized connotation or opinion value of an expression, such as negating the positive connotation of the word "good" in "it is not good", which changes the connotation of the sentence to a negative connotation. However, there are much more linguistic elements in a language that are not necessarily grammatical negators like the word "no" or "not" in the English language, or the "ne", "pas" in French, or "bu" in Chinese. The non-grammatical negator words are common words in a language, such as the word "prevent", "high", "low" in English as described above. Conventional approaches usually cannot address the context of such types that do not involve the grammatical negators. For example, the word "break" is commonly perceived to be associated with a negative connotation, and the word "barrier" can also be commonly perceived to be associated with a negative connotation, but none of the two words are grammatical negators like "no" or "not". A simple dictionary lookup method in the conventional approach may assign a negative connotation to the text unit of "break a barrier" as being negative based on the inherent negative connotation of the individual words in the text unit, thus producing an incorrect result. However, in the present invention, methods are provided for effectively solving such problems and producing correct results.

In the present invention, methods are provided for text units of various types of linguistic structures. In some embodiments, the present invention provides methods for determining the connotation of a text unit comprising at least two terms with one of them being a noun or noun phrase and one of them being a verb or verb phrase. The noun term can be a subject or an object of the verb. For example, in the text unit "bought a book", the verb is "bought" and the noun "book" or the noun phrase "a book" is the object of the verb. In another text unit, such as "the student bought a book", the noun term "student" is the subject of the verb "bought". As is noted above, in the present disclosure, the term "noun" or "noun phrase" is used interchangeably, and the same is also true for verb or a verb phrase, and other types of words or phrases. In some cases, the word "noun term" or "verb term" is also used to refer to either a noun as a single word, or a multi-word noun phrase, and the same also applied to verb or other parts of speech.

Figure 2:
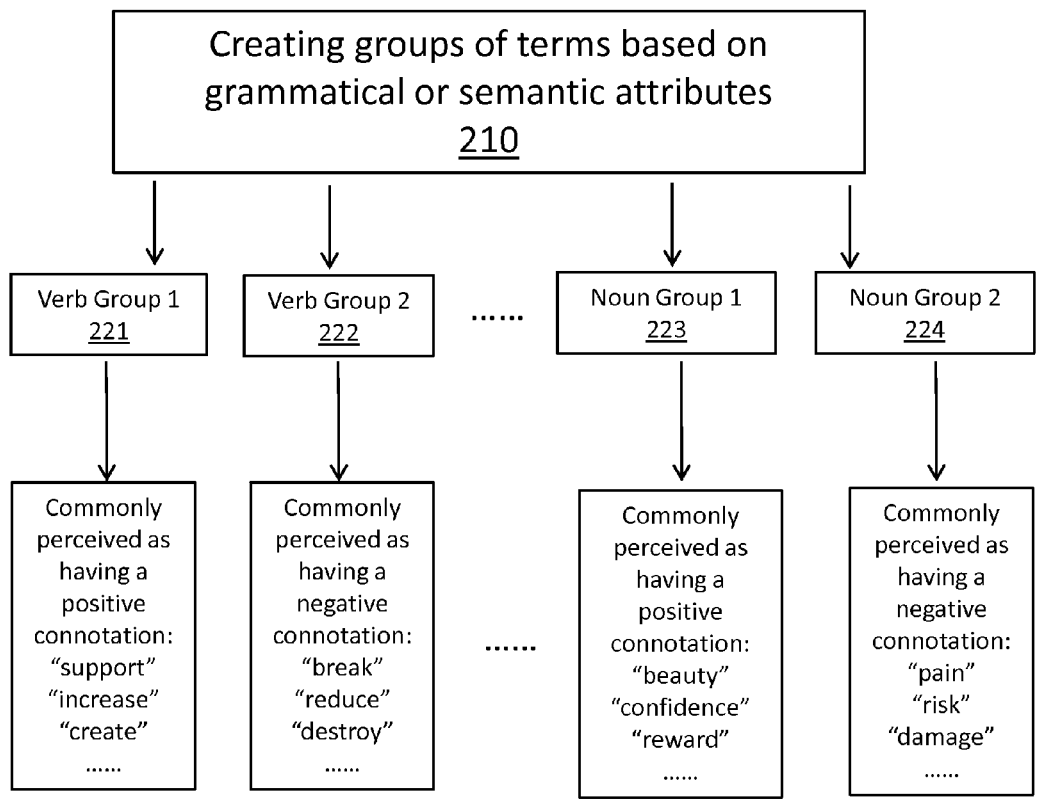
FIG. 2 illustrates one embodiment of the present invention in which terms in the English language are grouped based on grammatical or semantic attributes.

FIG. 2 illustrates one embodiment of the present invention in which terms in the English language are grouped based on grammatical or semantic attributes. Groups 221 and 222 are groups of terms that have the grammatical attribute of being a verb. Group 221 contains verbs that have a positive connotation by default, and Group 222 contains verbs that have a negative connotation by default. Similarly, Groups 223 and 224 are groups of terms that have the grammatical attribute of being a noun. Group 223 contains nouns that are commonly perceived to have a positive connotation, and Group 224 contains nouns that are commonly perceived to have a negative connotation. The present invention is not limited to these groupings, and the importance of these groupings will be explained further in the present disclosure.

A Verb with an Object Noun

In one embodiment, the present invention provides methods for determining the connotation of a text unit that comprises a verb and an object. For example, the phrase "prevent disease" is such a text unit. Similar units comprising a verb and an object can include examples like "solved a problem", "increased benefit", "reduced risks", "resolved disputes", "gained much weight", "improved symptoms of a cold", "lost confidence", etc. For expressions like those, it can be very challenging for conventional approaches to produce an accurate result in determining the connotation of the expression based on the dictionary lookup method of retrieving the default connotation of the individual words. For example, the default connotation of the verb words "prevent", "solve", "resolve", "improve", "increased", "gained", etc., can be positive in most of the dictionaries or based on common sense; and the verb "reduced", "lost" can have a negative connotation by default; and the connotations of noun words such as "problem", "disputes", "symptoms of a cold", etc., can be negative in most of the dictionaries or based on common sense. However, as can be seen from these examples, the connotation of the entire expression as a text unit does not necessarily have the same connotation as its component words. Rather, the connotation of the entire expression is dependent on the context in which the individual words occur. This context includes whether the connotation of the verb is positive or negative, and whether the connotation of the object noun is positive or negative, and what specific words are the verbs or the nouns.

The present invention provides methods for accurately determining the connotations of such expressions based on contextual analysis. In the present invention, a set of general rules (behavior patterns of verbs or noun) are defined in terms of possible ways certain verbs or nouns may contextually change the connotation of the text unit.

In one embodiment of the present invention, for a text unit containing two terms, with the first term being a verb and the second term being the object of the verb, a rule can be defined as:

Assign a negative connotation to the text unit if the verb is associated with a positive connotation and the noun is associated with a negative connotation, or assign a positive connotation to the text unit if the verb is associated with a positive connotation and the noun is also associated with a positive connotation.

This rule can be written in a more general form involving a first term and second term of a multi-term text unit to take into account different grammatical forms of text units other than verb+object structures:

Rule 1:

Assign a negative connotation to the text unit if the first term is associated with a positive connotation and the second term is associated with a negative connotation, or assign a positive connotation to the text unit if the first term is associated with a positive connotation and the second term is also associated with a positive connotation.

Rule 1 is an example of a context rule 150 in FIG. 1. Examples of English phrases where this rule is applicable can include "create problem", "raise alarm", and "increase risk" on one hand as having negative connotations, and phrases such as "create value", "provide support", and "increase benefit" on the other as having positive connotations.

Not all verbs in a language may follow this rule. In the present invention, a subset of verbs in a language can be identified that follow this rule. For example, in English, verbs such as "create", "provide", "increase", etc., generally exhibit such behavior, and can be assembled into a group, such that, at processing time, a verb can be checked for its group membership. This type of group can be an example of Group 221 as illustrated in FIG. 2. If a verb is a member of this group, then Rule 1 can be applied to determine the connotation of the text unit, together with the default connotation of the object noun. Such verbs can be identified either empirically by performing testing on individual verbs, or be identified by certain semantic attributes that are common to such verbs, as will be described later, or by certain statistical learning methods based on training data.

Figure 3:
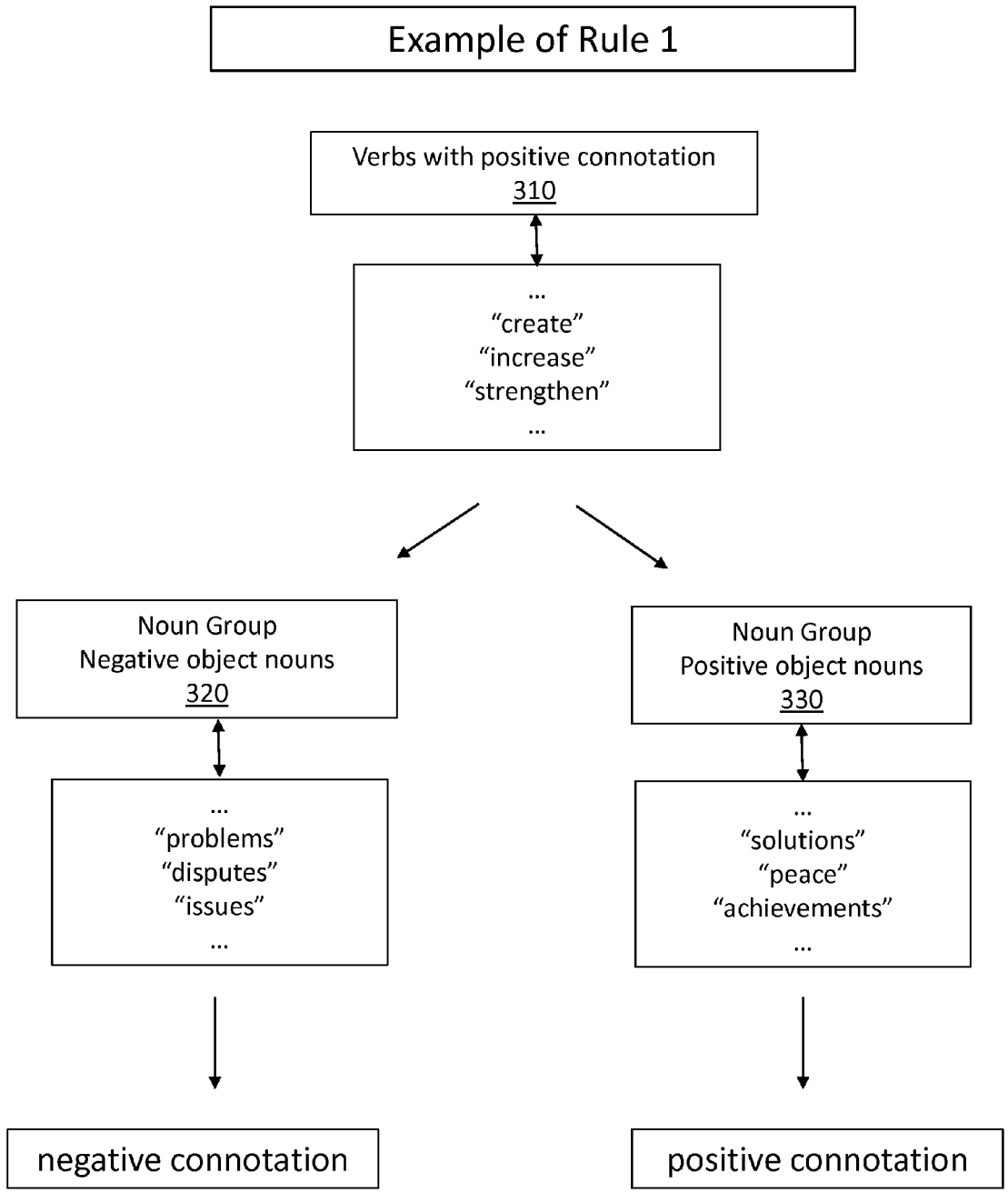
FIG. 3 illustrates one embodiment of Rule 1 in the present invention.

FIG. 3 illustrates one embodiment of Rule 1 in the present invention. Group 310 comprises of verbs that have a positive connotation, Group 320 comprises of object-nouns that have a negative connotation, and Group 330 comprises of object-nouns that have a positive connotation. A text unit comprising a verb from Group 310 and an object from Group 320 can be determined to have a negative connotation under Rule 1. A text unit comprising a verb from Group 310 and an object from Group 330 can be determined to have a positive connotation under Rule 1.

In some embodiments, a second rule can be defined as:

Assign a negative connotation to the text unit if the verb is associated with a negative connotation and the noun is associated with a positive connotation, or assign a positive connotation to the text unit if the verb is associated with a negative connotation and the noun is also associated with a negative connotation.

Writing this rule in its more general form:

Rule 2:

Assign a negative connotation to the text unit if the first term is associated with a negative connotation and the second term is associated with a positive connotation, or assign a positive connotation to the text unit if the first term is associated with a negative connotation and the second term is also associated with a negative connotation.

In the above case, the verb is the first term and the object is the second term in the general rule. Examples of phrases where this rule is applicable can include "destroy value", "reduce support", and "decrease benefit" on one hand as having negative connotations, and phrases such as "reduce risk", "destroy enemies", and "break barriers" on the other as having positive connotations. Similarly, another subset of verbs in a language can be identified that follow this rule. For example, in English, verbs such as "destroy", "reduce", "decrease", etc., generally exhibit such behavior, and can be assembled into a second group, such that, at processing time, a verb can be checked for its group membership. If it is a member of this group, then, Rule 2 can be applied to determine the connotation of the text unit, together with the default connotation of the object noun. Similar to Rule 1, such verbs can be identified either empirically by performing testing on individual verbs, or be identified by certain semantic attributes that are common to such verbs, as will be described later, or by certain statistical learning methods based on training data. In the following examples of other rules, such grouping methods generally apply to all rules, and will be omitted from description.

Figure 4:
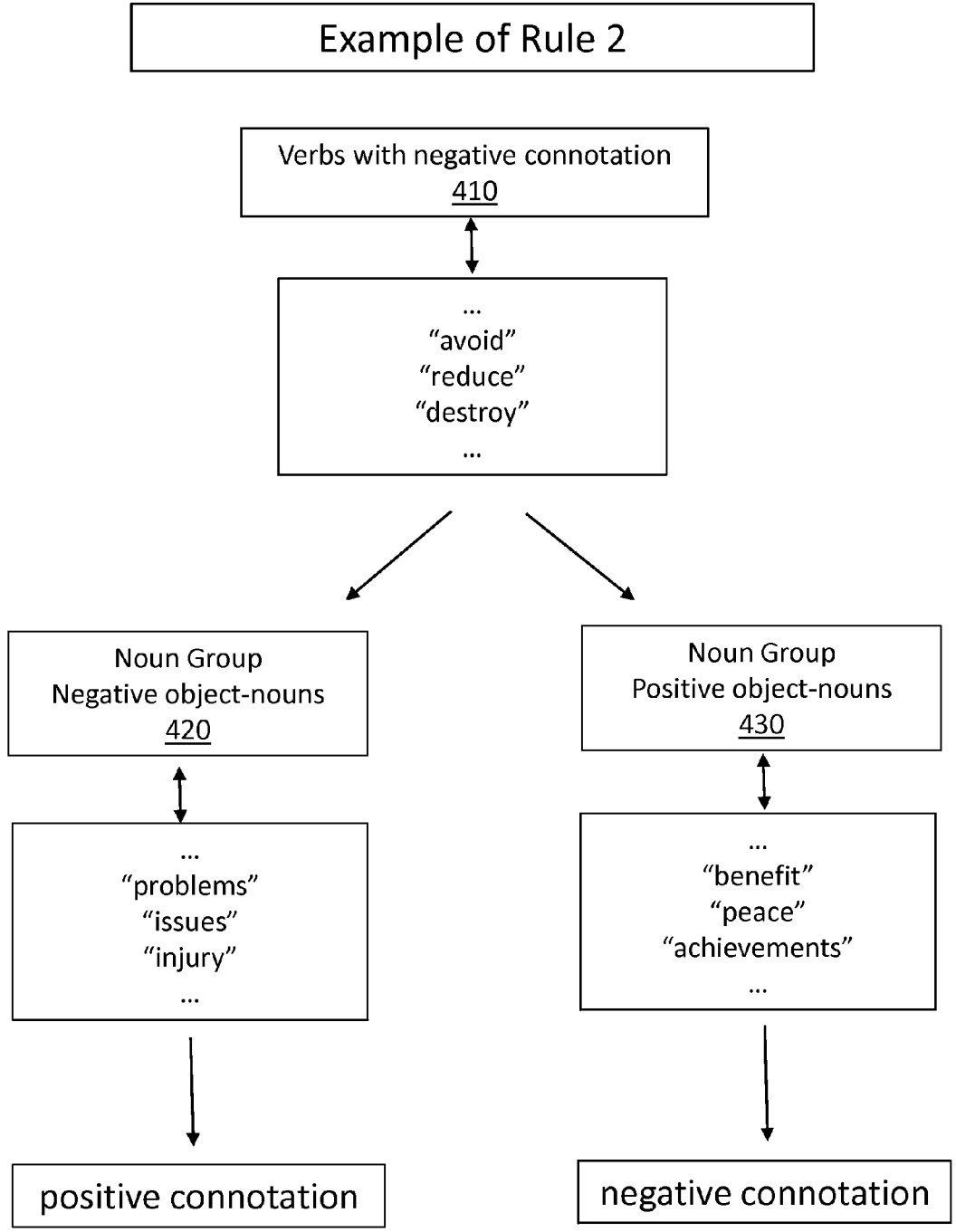
FIG. 4 illustrates one embodiment of Rule 2 in the present invention.

FIG. 4 illustrates one embodiment of Rule 2 in the present invention. Group 410 comprises of verbs that have a negative connotation, Group 420 comprises of object-nouns that have a negative connotation, and Group 430 consists of object-nouns that have a positive connotation. A text unit comprising a verb from Group 410 and an object from Group 420 can be determined to have a positive connotation under Rule 2. A text unit comprising a verb from Group 410 and an object from Group 430 can be determined to have a negative connotation under Rule 2.

In some embodiments, a third rule can be defined as:

Assign a positive connotation to the text unit if the verb is associated with a positive connotation and the noun is associated with a negative connotation, or assign a negative connotation to the text unit if the verb is associated with a positive connotation and the noun is also associated with a positive connotation.

Writing this rule in a more general form:

Rule 3:

Assign a positive connotation to the text unit if the first term is associated with a positive connotation and the second term is associated with a negative connotation, or assign a negative connotation to the text unit if the first term is associated with a positive connotation and the second term is also associated with a positive connotation.

Examples of phrases where this rule is applicable can include "solved problem", "repaired damage", and "prevented disease" on one hand as having positive connotations, and phrases such as "prevented work progress", and "mitigated support" on the other as having negative connotations.

As illustrated above, the verb "prevent" is commonly perceived to have a positive connotation, such as the name of a magazine known as "Prevention", or in an expression like "prevent disease". However, even though Rule 1 as described above also governs verbs with positive connotations, verbs like "prevent" generally follow Rule 3 much better than Rule 1.

Similarly, a subset of verbs in a language can be identified that follow this rule. For example, in English, verbs such as "solved", "resolve", "prevent", etc., generally exhibit such behavior, and can be assembled into a third group, such that, at processing time, a verb can be checked for its group membership. If it is a member of this group, then, Rule 3 can be applied to determine the connotation of the text unit, together with the default connotation of the object noun.

Figure 5:
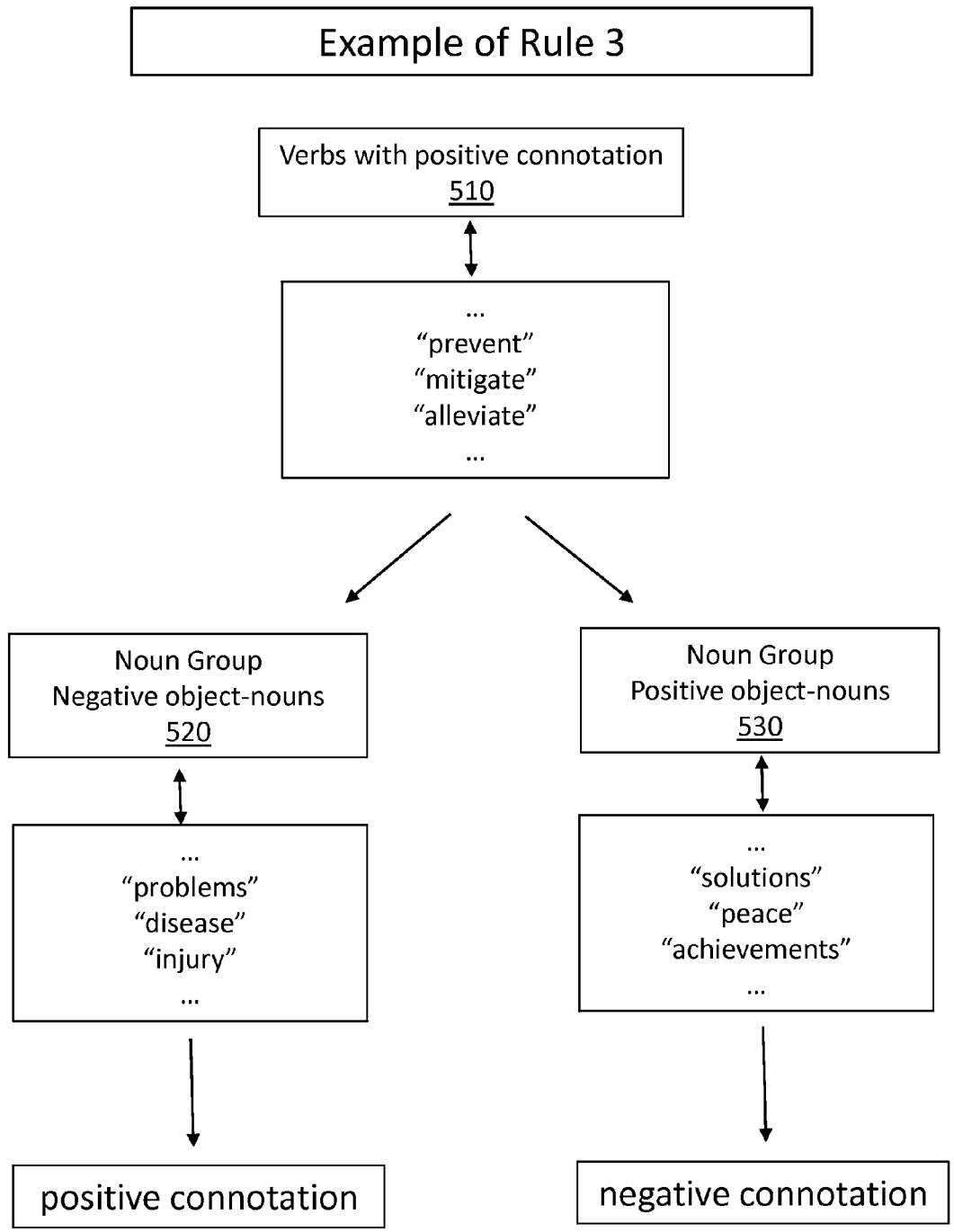
FIG. 5 illustrates one embodiment of Rule 3 in the present invention.

FIG. 5 illustrates one embodiment of Rule 3 in the present invention. Group 510 comprises of verbs that have a positive connotation, Group 520 comprises of object-nouns that have a negative connotation, and Group 530 consists of object-nouns that have a positive connotation. A text unit comprising a verb from Group 510 and an object from Group 520 can be determined to have a positive connotation under Rule 3. A text unit comprising a verb from Group 510 and an object from Group 530 can be determined to have a negative connotation under Rule 3.

In some embodiments, a fourth rule can be defined as:
Assign a negative connotation to the text unit if the verb is associated with a negative connotation and the noun is associated with a negative connotation, or assign a positive connotation to the text unit if the verb is associated with a negative connotation and the noun is associated with a positive connotation.

Again, writing this rule in a more general form:
Rule 4:
Assign a negative connotation to the text unit if the first term is associated with a negative connotation and the second term is associated with a negative connotation, or assign a positive connotation to the text unit if the first term is associated with a negative connotation and the second term is associated with a positive connotation.

Examples of phrases where this rule is applicable can include "incur a loss", "cram junk food", and "cause trouble" on one hand as having negative connotations; and "provoke insights", "cram nutrition", etc. in the other hand as having positive connotations. In these instances, the verbs are generally perceived to have a negative connotation by default, and nouns may be negative or positive in some cases.

Similarly, a subset of verbs in a language can be identified that follow this rule. For example, in English, verbs such as "incur", "cram", "provoke", "cause", etc., generally exhibit such behavior, and can be assembled into a fourth group, such that, at processing time, a verb can be checked for its group membership. If it is a member of this group, then, Rule 4 can be applied to determine the connotation of the text unit, together with the default connotation of the object noun.

Figure 6:
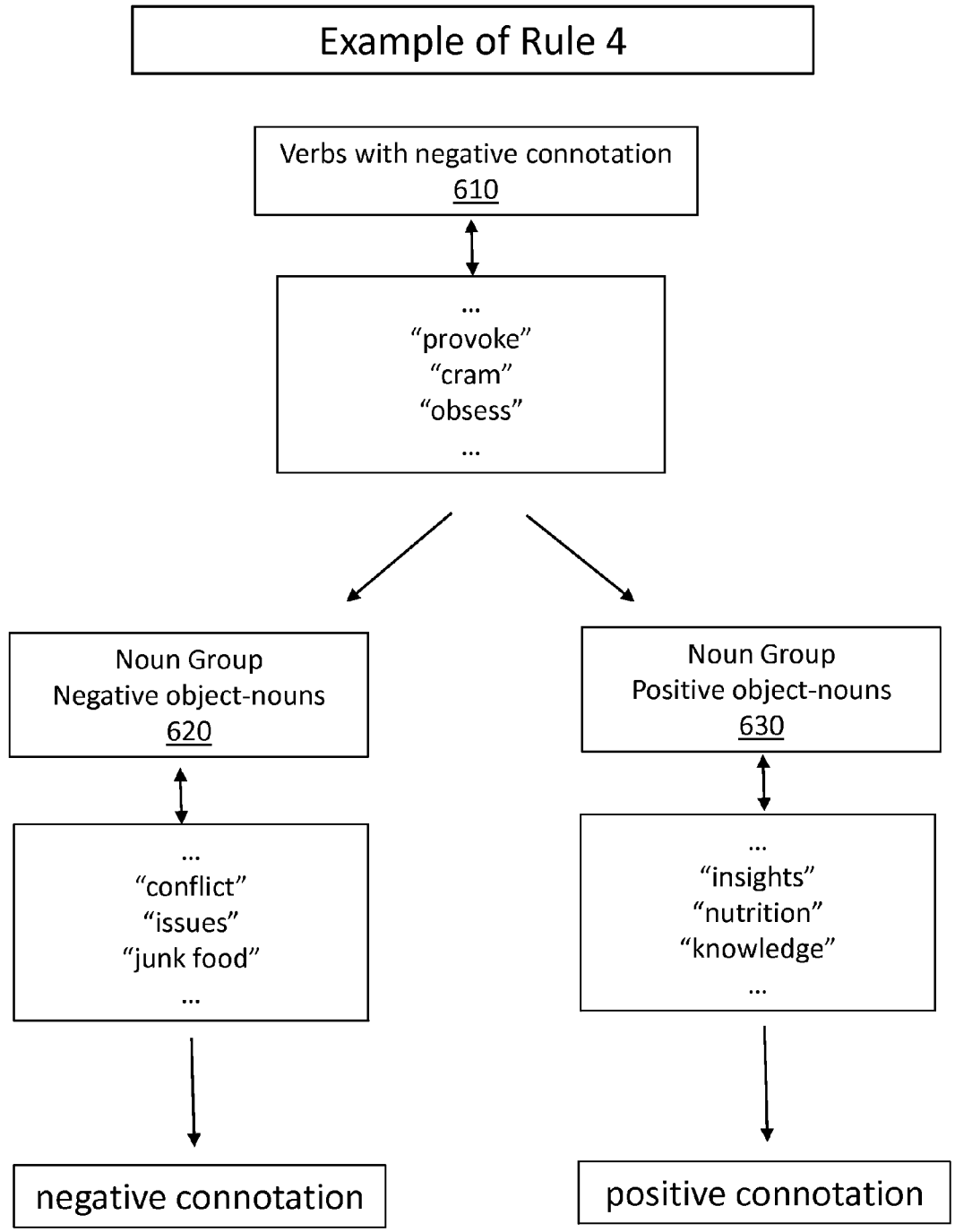
FIG. 6 illustrates one embodiment of Rule 4 in the present invention.

FIG. 6 illustrates one embodiment of Rule 4 in the present invention. Group 610 comprises of verbs that have a negative connotation, Group 620 comprises of object-nouns that have a negative connotation, and Group 630 consists of object-nouns that have a positive connotation. A text unit comprising a verb from Group 610 and an object from Group 620 can be determined to have a negative connotation under Rule 4. A text unit comprising a verb from Group 610 and an object from Group 630 can be determined to have a positive connotation under Rule 4.

In some embodiments, a fifth rule can be defined as:
Assign a negative connotation to the text unit if the verb is associated with a negative connotation regardless of the connotation of the noun.

Writing this rule in a more general form:
Rule 5:
Assign a negative connotation to the text unit if the first term is associated with a negative connotation regardless of the connotation of the noun.

Examples of phrases where this rule is applicable can include "hate this book", "dislike that dish", etc. In these instances, the verbs are generally perceived to have a negative connotation by default, and the overall connotation of the text unit is usually not affected by the connotation of the object noun.

Similarly, a subset of verbs in a language can be identified that follow this rule. For example, in English, verbs such as "hate", "dislike", etc., generally exhibit such behavior, and can be assembled into a fifth group, such that, at processing time, a verb can be checked for its group membership. If it is a member of this group, then, Rule 5 can be applied to determine the connotation of the text unit, regardless of the connotation of the object noun.

Figure 7:
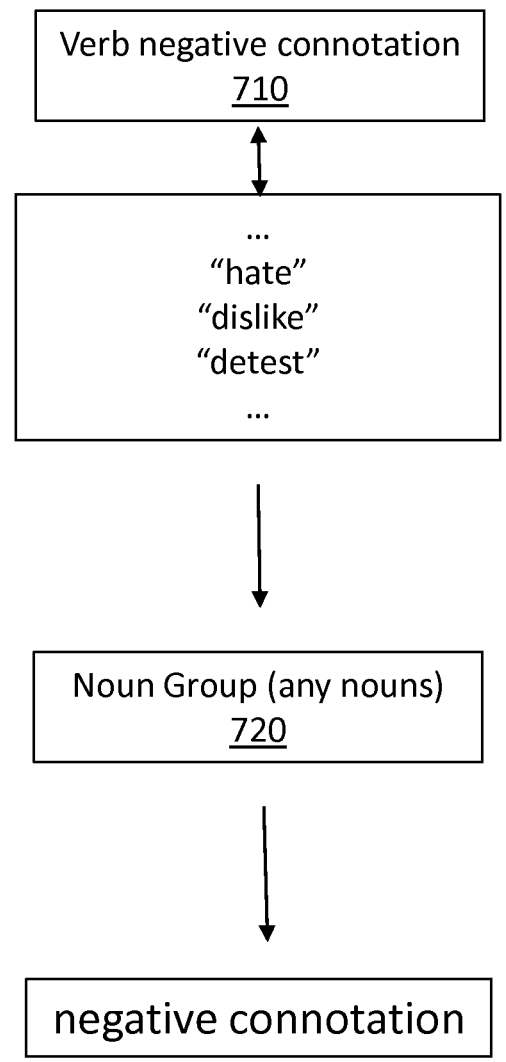
FIG. 7 illustrates one embodiment of Rule 5 in the present invention.

FIG. 7 illustrates one embodiment of Rule 5 in the present invention. Group 710 comprises of verbs that have a negative connotation, and Group 720 comprises of object-nouns. A text unit comprising a verb from Group 710 and an object-noun from Group 720 can be determined to have a negative connotation under Rule 5 without checking the default connotation of the object-noun.

In some embodiments, a sixth rule can be defined as:
Assign a positive connotation to the text unit if the verb is associated with a positive connotation regardless of the connotation of the noun.

Writing this rule in a more general form:
Rule 6:
Assign a positive connotation to the text unit if the verb is associated with a positive connotation regardless of the connotation of the noun.

Examples of phrases where this rule is applicable can include "enjoyed this book", "delighted his friends", and "applauded him", etc. In these instances, the verbs are generally perceived to have a positive connotation by default, and the overall connotation of the text unit is usually not affected by the connotation of the object noun.

Similarly, a subset of verbs in a language can be identified that follow this rule. For example, in English, verbs such as "enjoy", "love", "delight", etc., generally exhibit such behavior, and can be assembled into a sixth group, such that, at processing time, a verb can be checked for its group membership. If it is a member of this group, then, Rule 6 can be applied to determine the connotation of the text unit, regardless of the connotation of the object noun.

Figure 8:
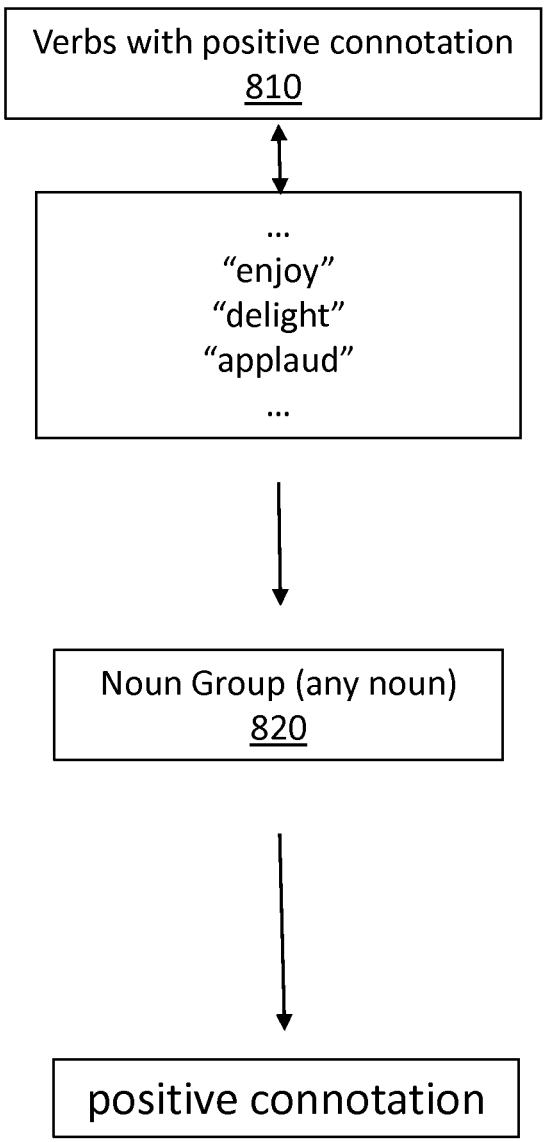
FIG. 8 illustrates one embodiment of Rule 6 in the present invention.
Figure 10:
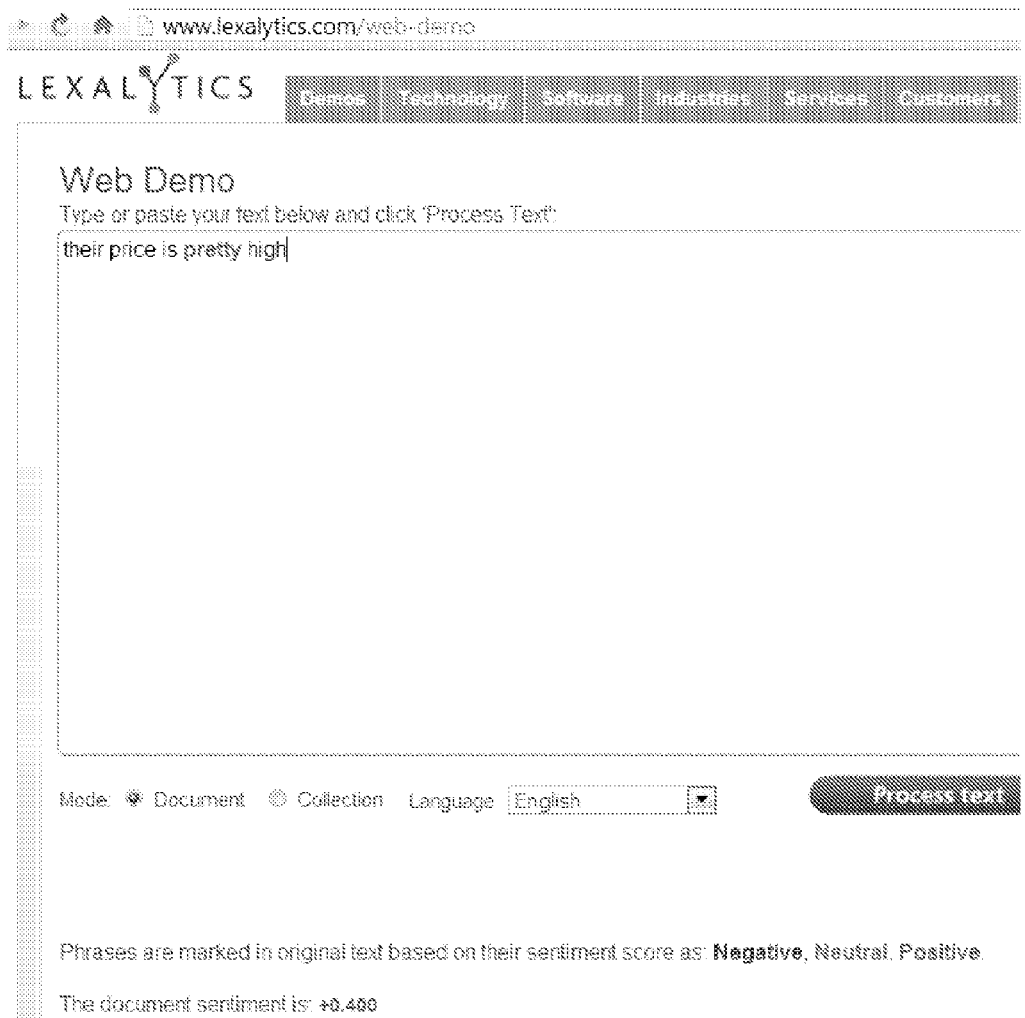
FIG. 10 is a screenshot of commercial web site showing a demo result using an approach in the current market.

FIG. 8 illustrates one embodiment of Rule 6 in the present invention. Group 810 comprises of verbs that have a positive connotation, and Group 820 comprises of object-nouns. A text unit comprising a verb from Group 810 and an object-noun from Group 820 can be determined to have a positive connotation under Rule 6 without checking the default connotation of the object-noun.

In some embodiments, a group of verbs that has more members can be set as default, such that, only a small portion of the verbs in a language need to be checked for group membership at processing time, while the rest of the verbs can apply a default rule without checking their group membership.

In some other embodiments, certain rules and the corresponding verb groups can be merged to simplify the process of representation, such as Rule 1 and Rule 2 can be merged, and verbs associated with Rule 1 and Rule 2 can be merged into a single group as well.

A Subject Noun with a Verb

In addition to the expressions with verb+object structure as described above, in some other embodiments, the present invention provides methods for determining the connotation of a text unit that comprises a subject noun and a verb. For example, the phrase "the problem disappeared", or "the symptoms improved" is such an expression as a text unit, in which the term "problem" or "the problem", and "symptoms" and "the symptoms" are the subject while the terms of "disappeared" and "improved" are verbs.

The methods and rules described above for a text unit having a verb+object structure can also be applied to a text unit having a subject+verb structure.

For example, for the verbs in the third group mentioned above which are associated with Rule 3 that have a default positive connotation, such as the verbs "prevent", "solve", etc., when used with a subject noun in a phrase such as in "the disease was prevented", or "the problem is solved", or "their achievements were prevented by the lack of support", Rule 3 can be applied where the verb is the first term and the subject is the second term.

With the above example, a note is in order regarding the definition of the grammatical "subject" or "object. The English language distinguishes a sentence in an active voice from a sentence in a passive voice. The sentence of "the problem is solved" is in a passive voice, in which the grammatical subject is still "the problem", even though semantically, it is more of an object of the verb "solve". In the present disclosure, the definition of the subject and object follows this convention.

Similarly, for verbs in the second group associated with Rule 2 that have a negative connotation by default, when used in text units such as "the storm subsided", and "the damage was minimized", Rule 2 can be applied where the verb is the first term which has a negative connotation, and the subject is the second term which has a negative connotation, making the overall connotation positive.

Generally, all six rules as exemplified with the verb+object structure can be applied to the subject+verb structure, thus more detailed examples are omitted here, as they are described above.

A First Noun with a Second Noun

In the English language, there is a linguistic structure comprising a first noun and a second noun, or noun +noun structure. For example, the expressions of "disease prevention", or "issue resolution", or "benefit reduction", etc., have this type of first noun+second noun structure, and the connotation of the entire structure may or may not be the same as the component nouns, but Rules 1 to 6 as described above can still hold in similar fashion in such cases by applying the rules where the second noun in the noun+noun structure is the first term, and the first noun in the structure is the second term. For example, in the expression of "disease prevention", the first noun of "disease" can have a negative connotation, and the second noun of "prevention" can have a positive connotation, and the entire expression can have a positive connotation which can be determined by applying Rule 3 to a first noun+ second noun structure.

On the other hand, in the expression of "benefit reduction", the first noun of "benefit" can have a positive connotation, and the second noun of "reduction" can have a negative connotation, and the entire expression can have a negative connotation which can be determined by applying Rule 2.

Similarly, the connotation of noun+noun expressions such as "the risk increase", or "the benefit increase", etc, can be determined by applying Rule 1.

The connotation of noun+noun expressions such as "damage aggravation", or "symptoms worsening", can be determined by applying Rule 4.

A First Noun with a Preposition and a Second Noun

In the English language, there is a similar linguistic structure comprising a first noun and a preposition and a second noun, or noun+preposition+noun structure. For example, the expressions of "the prevention of disease", or "the resolution of issues", or "the reduction of benefit", etc., have this type of first noun+preposition+second noun structure, and the connotation of the entire structure may or may not be the same as the component nouns, but Rules 1 to 6 as described above can still apply to such cases where the first noun in the structure is the first term, and the second noun in the structure is the second term. For example, in the expression of "the prevention of disease", the first noun of "prevention" can have a positive connotation, and the second noun of "disease" can have a negative connotation, and the entire expression can have a positive connotation which can be determined by applying Rule 3.

On the other hand, in the expression of "the reduction of benefit", the first noun of "reduction" can have a negative connotation, and the second noun of "benefit" can have a positive connotation, and the entire expression can have a negative connotation which can be determined by applying Rule 2.

Similarly, the connotation of noun+preposition+noun expressions such as "the increase of risk", or "the increase of benefit", etc, can be determined by applying Rule 1.

Furthermore, the connotation of noun+preposition+noun expressions such as "the aggravation of damage", or "the worsening of symptoms", etc, can be determined by applying Rule 4 with the first noun being the first term, and the second noun being the second term.

In some embodiments, similar to the case with verb+object structure, some rules can be merged for a simplified representation when the connotation value of the verb is not critical to the implementation, and the connotation of the entire expression can be determined by identifying the membership of the verb, or the first noun, or the second noun in one of the groups as described above. For example, Rule 1 and Rule 2 can be merged as a single rule based on how each rule is applied to second nouns, and the first and the second groups can be merged into a single group, without distinguishing whether the default connotation of a first noun or the second noun in the group is positive or negative, or neutral.

An Adjective Modifying a Noun

In some other embodiments, the present invention further provides methods for determining the connotation or sentiment type of additional linguistic structures.

In the English language, a common structure is a noun phrase comprising an adjective and a noun, with the adjective as a modifier of the noun, while the noun can be called the head of the noun phrase. For example, in the phrase "digital camera", the word "digital" is an adjective modifying the noun "camera", while the noun "camera" can be called the head of the phrase. While each component term of the phrase may have its own connotation type, the connotation or sentiment type of the entire noun phrase as an expression or structure often cannot be easily determined by looking up the connotations of the component terms of the adjective or the head noun. For example, the adjective of "high" is often perceived as having a positive connotation, such as in "the quality is high" or "the standard is high" or "I think of him highly". However, not all phrases with the word "high" as the adjective will have a positive connotation. For example, in the phrase of "high price", or "high blood pressure", the phrase is generally perceived as having a negative connotation, even though the word "high" may have a positive connotation. Whether the phrase as a whole will have a positive or negative connotation depends on the specific context. In the present invention, such context can also be handled by certain rules. The present invention provides methods for appropriately determining the connotation or sentiment type of phrases with this type of structure.

In the present invention, subsets of adjectives and nouns in a language are assembled into different groups. In some embodiments, a first group of adjectives is set up to include a subset of adjectives in the language, each of the adjectives in this group is associated with a generally perceived positive connotation, and can be treated as having a positive connotation when used alone or in certain neutral context. Examples of such adjectives in the English language can include terms like "high", "quick", "fast", "large", "big", etc. Furthermore, a first group of nouns can also be set up to include a subset of nouns in the language, such as the terms of "quality", "standard", "value", "response", "support", etc., in the English language, each of which may be treated as to carry either a positive or neutral connotation. An algorithmic rule can be set up to determine the connotation of a phrase having the structure of adjective+noun. For example, a rule for this can be like the following:

(Rule 7): If the adjective is a member of the first group and if the noun is a member of the first noun group, then, assign a positive connotation to the phrase having a structure of adjective+noun.

Furthermore, a second group of nouns can be assembled to include another subset of nouns in the language, each of which may be treated as carrying either a negative or neutral connotation. Examples of nouns for the second noun group can include nouns such as "price", "blood pressure", and "cholesterol", etc., in the English language. And an algorithmic rule can be set up to determine the connotation of a phrase having the structure of adjective+noun. For example, a rule for this can be like the following:

(Rule 8): If the adjective is a member of the first group and if the noun is a member of the second noun group, then, assign a negative connotation to the phrase having a structure of adjective+noun.

Furthermore, a third group of nouns can be assembled to include another subset of nouns in the language, each of which may be treated as carrying a neutral connotation. Examples of nouns for the third noun group can include nouns such as "rise", "level", "size", and "exit", etc., in the English language, for phrases like "high rise", "high level", large size", "quick exit", etc., which are generally perceived to be neutral in connotation. And an algorithmic rule can be set up to determine the connotation of a phrase having the structure of adjective+noun. For example, a rule for this can be like the following:

(Rule 9): If the adjective is a member of the first group and if the noun is a member of the third noun group, then, assign a neutral connotation to the phrase having a structure of adjective+noun.

In some embodiments, a second group of adjectives is also set up to include a subset of adjectives in the language, each of the adjective in this group are associated with a generally-perceived negative connotation, and can be treated as having a negative connotation when used alone or in certain neutral context. Examples of such adjectives can include terms like "low", "slow", "small", "dark", etc. The membership of a noun in the first, second and third group of nouns as described above can also be used in determining the connotation of the phrase. For example, when nouns of the first group such as the terms of "quality", "standard", "value", "response", etc., are used with the second group of adjectives, they form phrases like "low quality", "low standard", "slow response", etc., and can generally be assigned a negative connotation. An algorithmic rule can be set up to determine the connotation of a phrase having the structure of adjective+noun. For example, a rule for this can be like the following:

(Rule 10): If the adjective is a member of the second group and if the noun is a member of the first noun group, then, assign a negative connotation to the phrase having a structure of adjective+noun.

Furthermore, when nouns of the second group such as "price", "expense", "consumption", etc., are used with the second group of adjectives, they form phrases like "low price", "low expense", "slow consumption", etc., and can generally be assigned a positive connotation. An algorithmic rule can be set up to determine the connotation of a phrase having the structure of adjective+noun. For example, a rule for this can be like the following:

(Rule 11): If the adjective is a member of the second group and if the noun is a member of the second noun group, then, assign a positive connotation to the phrase having a structure of adjective+noun.

Furthermore, when nouns of the third group such as "rise", "water level", "size", and "exit", etc., are used with the second group of adjective, they form phrases like "low rise", "low water level", small size", "slow exit", etc., which are generally perceived to be neutral in connotation. And an algorithmic rule can be set up to determine the connotation of a phrase having the structure of adjective+noun. For example, a rule for this can be like the following:

(Rule 12): If the adjective is a member of the second group and if the noun is a member of the third noun group, then, assign a neutral connotation to the phrase having a structure of adjective+noun.

As can be seen from the above description, the third group of nouns can be optional, or be the default if a noun is not a member of the first or the second noun group, and in such cases, the connotation of the phrase can be determined to be neutral no matter which adjective group the adjective is a member of, and in such cases, Rule 12 and Rule 9 can be omitted.

In some embodiments, adjective groups other than the first and second adjective groups as described above can be set up, and noun groups other than the first and second noun groups as described above can also be set up. The principle of the methods provided by the present invention is to determine the connotation of the phrase based on the context in terms of what type of adjectives are modifying what type of nouns, and apply rules to capture certain linguistic patterns.

For the adjective+noun structure, especially when the third group of nouns are omitted as described above, a simplified method is to use Rules 1 to 6 as described above. In this case, the adjective can be the first term and the noun can be the second term. Generally, the same effect can be achieved by applying Rules 1 to 6 for the adjective+noun structure.

A Subject Noun with Adjective as Predicative

The method for the phrase with the structure of adjective+noun can also be applied to structures such as subject+be+adjective, in which the adjective is sometimes known as a "predicative", while the "be" is known as a "linking verb".

For example, sentences like "the price is high" and "the quality is high" are of this type of structure. In determining the connotation of sentence like these, the rules for the adjective+noun structure as described above can also be applied. For example, in "the price is high", the noun is a member of the second noun group, and the adjective is a member of the first adjective group, and by applying Rule 8, the sentence is assigned a negative connotation. Similarly, in the sentence "the quality is high", the noun is a member of the first noun group, and the adjective is a member of the first adjective group; and by applying Rule 7, the sentence is assigned a positive connotation. Furthermore, in the sentence "the quality is low", the noun is a member of the first noun group, and the adjective is a member of the second adjective group; and by applying Rule 10, the sentence is assigned a positive connotation. Other rules can also apply to other combinations of the adjective group and the noun group for this type of subject+be+adjective structure.

Similarly, a simplified method is to use Rules 1 to 6 as exemplified with verb+noun structure in the same way as the rules are used for other structures as described above. In this case, the adjective can be the first term and the subject can be the second term. Generally, the same effect can also be achieved by applying Rules 1 to 6 for the subject+be+adjective structure.

An Adjective Followed by a Preposition and a Noun

The method for the phrase with the structure of adjective+noun can also be applied to structures such as adjective+preposition+noun. For example, the phrases such as "high in quality", "low in price", as in the sentence "The product is high in quality and low in price", or "high in price", or "low in quality" are of this type. In determining the connotation of structures like these, the rules for the adjective+noun structure as described above can also be applied. For example, in the phrase "high in price", the noun is a member of the second noun group, and the adjective is a member of the first adjective group, and by applying Rule 8, the phrase is assigned a negative connotation. Similarly, in the sentence "high in quality", the noun is a member of the first noun group, and the adjective is a member of the first adjective group; and by applying Rule 7, the phrase is assigned a positive connotation. Furthermore, in the phrase "low in quality", the noun is a member of the first noun group, and the adjective is a member of the second adjective group; and by applying Rule 10, the sentence is assigned a positive connotation. Other rules can also apply to other combinations of the adjective group and the noun group for this type of adjective+preposition+noun structure.

Similarly, a simplified method is to use Rules 1 to 6 as described above. In this case, the adjective can be the first term and the noun can be the second term. Generally, the same effect can also be achieved by applying Rules 1 to 6 for the adjective+preposition+noun structure.

An Adjective Followed by a Preposition and a Verb

The method for the phrase with the structure of adjective+noun can also be applied to structures such as adjective+preposition+verb in a similar manner. For example, the phrases such as "easy to use" or "difficult to build" as in the sentence "The device is easy to use, but difficult to build" are of this type. In determining the connotation of structures like these, the rules for the adjective+noun structure as described above can also be applied by changing the noun to a verb, and setting up different verb groups to match the corresponding adjective groups. For example, different verb groups can be set up to include subsets of verbs in a language, and the connotation of the phrase can be determined by checking whether the adjective is a member of a particular adjective group, and whether the verb is a member of a particular verb group, in a way similar to the methods described above for nouns and adjective; and corresponding rules can be set up for application in different embodiments to assign the contextualized connotation of the phrase.

Similarly, a simplified method is to use Rules 1 to 6 as exemplified with verb+noun structure in the same way as the rules are used for other structures as described above. In this case, the adjective can be the first term and the verb can be the second term. Generally, the same effect can also be achieved by applying Rules 1 to 6 for the adjective+preposition+verb structure.

It should be noted that the above descriptions are only examples of the most common cases based on the English language. The principles and methods disclosed in the present invention can be applied to other structures not exhaustively described in the present disclosure, while variations of the principles and methods can be employed without deviating from the spirit of the present invention.

Alternative Embodiments

In some embodiments, the default connotation of the verb or nouns or adjectives in such groups is not checked when determining the contextualized connotation of the text unit. For instance, in the case of verbs in a language, a first group, call it Group A, of verbs are identified as a subset of verbs in a language. Members of this verb group can have a common semantic or conceptual attribute or characteristics of signifying a process of increase or creation. For example, in the English language, verbs such as increase, create, grow, heighten, rise, strengthen, appear, etc., can belong to this group of verbs.

A rule can be established to determine the contextualized connotation of the text unit comprising a verb +object structure. Once the membership of the verb is identified, the contextualized connotation of the text unit can be determined according to the connotation of the object noun. For example, if the object noun has a positive connotation, then the contextualized connotation of the text unit can be determined to be also positive, such as in the text unit "increase benefit", etc., and if the object noun has a negative connotation, then the contextualized connotation of the text unit can be determined to be also negative, such as in the text unit "increase cost", etc., and in some cases, if the object noun has a neutral connotation, then the contextualized connotation of the text unit can be determined to be also neutral, such as in the text unit "increase size", etc. An algorithmic rule can be set up to capture this pattern. For example, If a verb is a member of Group A, then, assign a positive connotation to the text unit if the connotation of the object noun is positive; or assign a negative connotation to the text unit if the connotation of the object noun is negative.

This rule can be written in a more general form involving a general Group A for more than just verbs and a first term and second term of a multi-term text unit to take into account different grammatical forms of text units other than verb+object structures:

Rule 13:
If the first term is a member of Group A, assign a negative connotation to the text unit if the second term is associated with a negative connotation, or assign a positive connotation to the text unit if the second term is associated with a positive connotation.

In some embodiments, a second group, call it Group B, of verbs are identified as another subset of verbs in a language.

Members of this verb group can have a common semantic or conceptual attribute or characteristics of signifying a process of decrease or disappearance or destruction. For example, in the English language, verbs such as decrease, disappear, destroy, lower, reduce, weaken, etc., can belong to this group of verbs. A rule can be established to determine the contextualized connotation of the text unit comprising a verb of this group and an object noun. Once the membership of the verb is identified, the contextualized connotation of the text unit can be determined according to the connotation of the object noun. For example, if the object noun has a positive connotation, then the contextualized connotation of the text unit can be determined to be negative, such as in the text unit "reduce benefit", etc.; and if the object noun has a negative connotation, then the contextualized connotation of the text unit can be determined to be positive, such as in the text unit "reduce cost", etc.; and in some cases, if the object noun has a neutral connotation, then the contextualized connotation of the text unit can be determined to be also neutral, such as in the text unit "reduce size", etc. Similarly, a generalized rule similar to Rule 13 can be set up to capture this pattern.

Rule 14:
If the first term is a member of Group B, assign a negative connotation to the text unit if the second term is associated with a positive connotation, or assign a positive connotation to the text unit if the second term is associated with a negative connotation.

The same grouping methods and rules apply to verbs in a text unit with the subject+verb structure, to nouns in a text unit with the first noun+second noun structure, and to nouns in a text unit with the first noun+preposition+second noun structure.

In the case of a text unit having a structure of subject+verb, once the membership of the verb is identified, the contextualized connotation of the text unit can be determined according to the connotation of the subject noun. For example, when the verb is a member of the first group or Group A, if the subject noun has a positive connotation, then the contextualized connotation of the text unit can be determined to be also positive, such as in the text unit "the benefit increased". If the subject noun has a negative connotation, then the contextualized connotation of the text unit can be determined to be also negative, such as in the text unit "the cost increased", and in some cases, if the subject noun has a neutral connotation, then the contextualized connotation of the text unit can be determined to be also neutral, such as in the text unit "the size increased". Rule 13 can be used for this structure with the verb being the first term and the subject being the second term.

Similarly, when the verb is a member of the second group or Group B, the contextualized connotation of the text unit can be determined according to the connotation of the subject noun, but with the second rule. For example, if the subject noun has a positive connotation, then the contextualized connotation of the text unit can be determined to be negative, such as in the text unit "the benefit is reduced"; if the subject noun has a negative connotation, then the contextualized connotation of the text unit can be determined to be positive, such as in the text unit "the cost is reduced"; and in some cases, if the subject noun has a neutral connotation, then the contextualized connotation of the text unit can be determined to be also neutral, such as in the text unit "the size is reduced". In this case, Rule 14 can be applied with the verb being the first term and the subject being the second term.

In the case of text unit having a structure of first noun+second noun, such as "benefit reduction", or "cost reduction", the second noun is conceptually similar to the verb in the second group or Group B, and in fact, many of such nouns can be morphologically derived from their corresponding verbs, such as "reduction" being derived from the verb "reduce", etc. Similar to the methods used for verbs, a first and second group of nouns can be identified for the second noun in the structure, and once the membership of the second noun is identified, the contextualized connotation of the text unit can be determined according to the connotation of the first noun. For example, when the second noun is a member of the first group, if the first noun has a positive connotation, then the contextualized connotation of the text unit can be determined to be also positive, such as in the text unit "benefit increase"; if the first noun has a negative connotation, then the contextualized connotation of the text unit can be determined to be also negative, such as in the text unit "cost increase"; and in some cases, if the first noun has a neutral connotation, then the contextualized connotation of the text unit can be determined to be also neutral, such as in the text unit "size increase". Similarly, Rules 13 and 14 can generally be applied respectively with the second noun being the first term and the first noun being the second term.

In the case of text units having a structure of first noun+preposition+second noun, such as "reduction of benefit", or "reduction of cost", the first noun is conceptually similar to the verb in the first group. Similar to the methods used for noun+noun structure above, once the membership of the first noun is identified, the contextualized connotation of the text unit can be determined according to the connotation of the second noun. For example, when the first noun is a member of the first group, if the second noun has a positive connotation, then the contextualized connotation of the text unit can be determined to be also positive, such as in the text unit "increase of benefit"; if the second noun has a negative connotation, then the contextualized connotation of the text unit can be determined to be also negative, such as in the text unit "increase of cost"; and in some cases, if the second noun has a neutral connotation, then the contextualized connotation of the text unit can be determined to be also neutral, such as in the text unit "increase of size". Similarly, Rules 13 and 14 can generally be applied respectively with the first noun being the first term and the second noun being the second term.

Similarly, for text units that have an adjective+noun structure, a first group of adjectives can be identified. This group of adjectives can usually be those that conceptually signify a state of certain things having an increasing or creation tendency, or implying a connotation that may more likely to be perceived as positive, such as the adjectives of "high", "fast", "long", "large", "strong", etc. And a second group of adjectives can be identified to include those adjectives in a language that conceptually signify a state of certain things have a decreasing or diminishing tendency, or implying a connotation that may more likely to be perceived as negative, such as the adjectives of "low", "slow", "short", "small", "weak", etc. And a third group of adjectives can be identified to include those adjectives in a language that conceptually signify a balanced state of certain things, or implying a connotation that may more likely to be perceived as either neutral or slightly on the positive side, such as the adjectives of "common", "normal", "medium", "ordinary", "stable", etc.

Furthermore, a first group of nouns can be identified to include a subset of nouns in a language that usually are conceptually associated with names of things that provide or increase useful resources, such as "quality", "support", "growth rate", "income", "life", etc. And a second group of nouns can be identified to include a subset of nouns in a language that usually are conceptually associated with names of things that reduce or decrease useful resources, such as "cost", "consumption", "expense", "wait", etc. And a third group of nouns can be identified to include a subset of nouns in a language that are not conceptually associated with names of things that either create or consume useful resources, but more likely with name of attributes or states of things, such as "speed", "size", "weight", "water level", "blood pressure", etc.

With the above groups identified, the contextualized connotation of text units having a structure of adjective+noun can be determined by the group membership of the adjective and the noun. For example, if the adjective is a member of the first adjective group; and if the noun is a member of the first noun group, then the connotation of the text unit can be determined to be positive, such as in "high quality", "long life", etc. And if the adjective is a member of the first adjective group; and if the noun is a member of the second noun group, then the connotation of the text unit can be determined to be negative, such as in "high cost", "long wait", etc.

If the adjective is a member of the second adjective group; and if the noun is a member of the first noun group, then the connotation of the text unit can be determined to be negative, such as in "low quality", "weak support", etc. If the adjective is a member of the second adjective group, and if the noun is a member of the second noun group, then the connotation of the text unit can be determined to be positive, such as in "low cost" "short wait", etc.

If the adjective is a member of the third adjective group, and if the noun is a member of the third noun group, then the connotation of the text unit can be determined to be either positive, such as in "normal weight", "stable support", etc., or neutral such as in "ordinary speed", "medium size", etc.

Other combinations of adjective and noun groups can be handled with finer granulated sub-groupings to handle certain special cases, such as some nouns in the third noun group like "blood pressure", which can be negative with both the first and second group of adjectives, as in "high blood pressure", and "low blood pressure", while other nouns in the third noun group can be either positive, negative, or neutral with the first and second group of adjectives, such as in "high speed", "low speed", etc., depending on additional contextual information.

Similarly, in cases when the third groups of adjectives and nouns are not critical and can thus be omitted, Rules 13 and 14 above can generally be applied respectively with the adjective being the first term and the noun being the second term.

The above described methods of grouping nouns, verbs, and adjectives, etc., are only examples for illustrating the principle of the methods of the present invention. Combinations of other grammatical components or parts of speech are not exhaustively exemplified here. However, the basic principle of grouping words in a language based on certain semantic or conceptual attributes or characteristics, and setting up rules for combination of words in different groups for the purpose of determining contextualized connotation or sentiment type of text unit of various syntactic structures can apply to various other combinations or text unit with various other structures.

In some embodiments, the verbs or nouns or adjectives in separate groups as described above are not separately assembled into individual or mutually exclusive groups or lists. Instead, the group memberships of such verbs or nouns or adjectives are treated as attributes or labels or tags of the terms, and such terms can be labeled or marked in their original dictionary as having membership to one or more groups, and such attributes can be retrieved at processing time.

One advantage of the present invention is the higher accuracy in gauging sentiment over conventional approaches. As is mentioned above, conventional approaches are limited to single-word dictionary lookup for determining the connotation or sentiment type of user expressions. For example, for the sentence "The price is pretty high", the conventional approach will consider this sentence as being positive in sentiment, due to the commonly perceived positive connotation or sentiment type of words in the sentence like "pretty", and "high", as can be seen from certain websites at the time of this writing, where the individual words like "pretty" are highlighted in a special color to indicate a positive sentiment, and the overall sentiment level of the expression is incorrectly determined as being positive.

In contrast, in the present invention, context information is taken into account, and sentences like "The price is pretty high" will accurately be determined to have a negative connotation or sentiment type, due to the use of "high" in the context of "price", as well as overriding the default positive connotation of "pretty" in such a context.

The results from the present invention can be output for further analysis, such as statistical analysis, and trend prediction when a large amount of social data is analyzed. Compared with conventional approaches that do not perform contextualized analysis, the methods of the present invention can provide much enhanced results for such purposes.

The context-based connotation or sentiment type determination using the methods of the present invention can be used for various purposes in addition to displaying and highlighting the text unit that carry positive or negative opinion, including document tagging, classification, reporting, and statistical analysis, and trend predication. The connotation or sentiment type of each text unit in such text contents can be combined to produce an overall sentiment gauge carried in the text content, or in multiple text content, such as surveys, social network comments, emails, SMS, phone conversation transcripts, social network comment, etc.

One particular application of the present invention is for more advanced search engines to be able to let users search by sentiment type or use opinion on certain things.

In some embodiments, the present invention first process the text data in the search repository, and identify information about various types of text units contained in a plurality of documents that are associated with an search index. Instead of simply indexing the keywords contained in the documents as is done by conventional search methods, the present invention can identify the linguistic structural features of the text and context, such as the various structures for contextualized connotation or sentiment type analysis as described above. One particular structure is the "subject+linking verb+adjective", or "subject+predicative". When the subject term of the text, and the connotation or sentiment type of the structure can be correctly identified using the method of the present invention, the search engine can enable search queries such as "search positive comments on iPhone", or "search negative comments on iPad", or "search positive or negative comments on drug X", etc. The search engine can match keywords such as "iPhone", "iPad", "Drug X" with the terms in the text that are the subject of text units, and select those terms that are the predicative, or other "verb+object" units as the predicate of the subject terms in the corresponding text units.

For example, if the contents in the search repository contain sentences such as "My iPhone is great", "My iPad is terrible", or "Drug X has bad side effects", or "Drug X help me a lot", etc., in response to the above example queries, result such as "great", "terrible", "has bad side effects", "help me a lot", etc., can be returned for the respective queries. Such search features are generally not available in the current market, but with the system and methods of the present invention, such features can be enabled; result can be displayed to the user in various ways, and the users can be better served.

The methods disclosed in the present invention can be implemented on a computer system.

Figure 11:
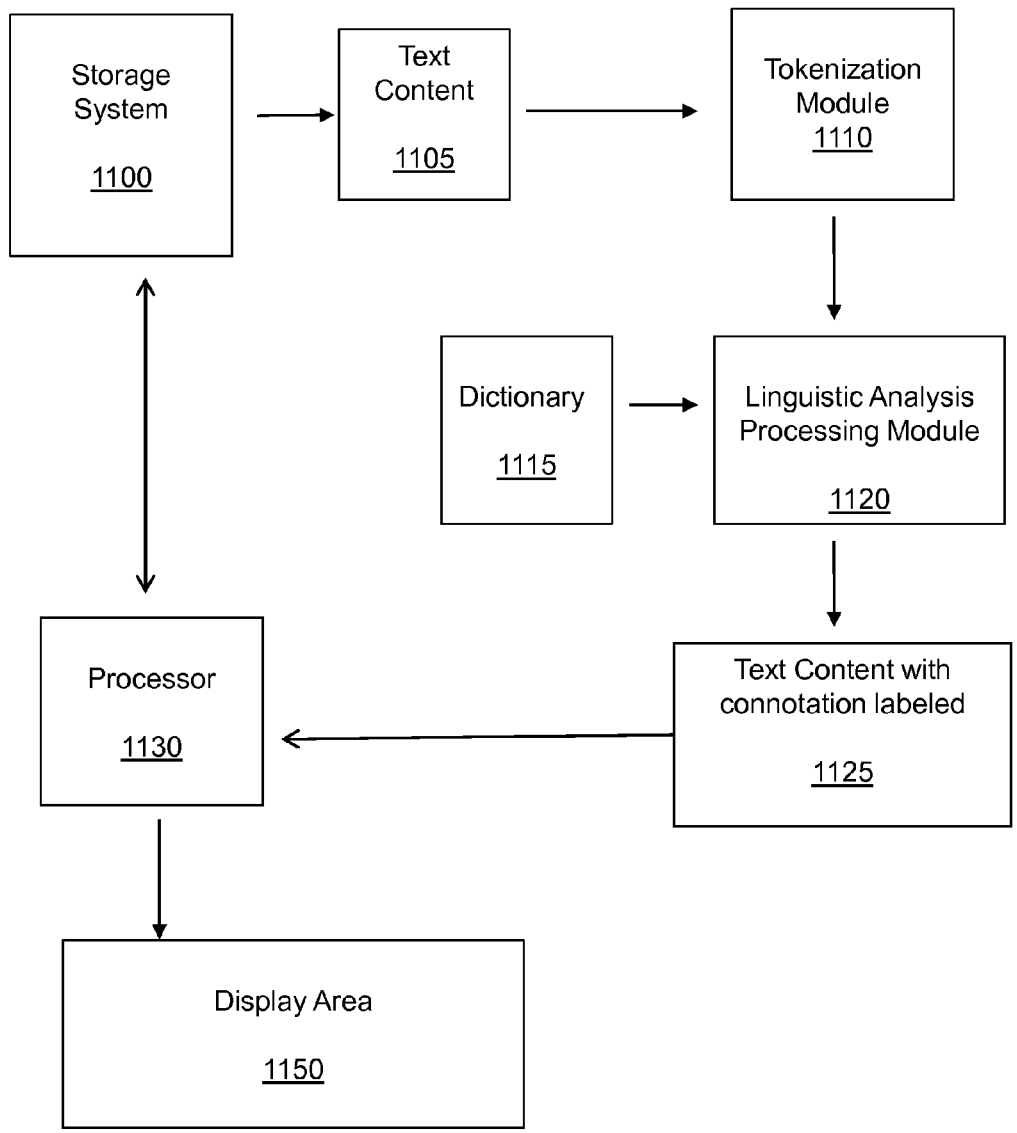
FIG. 11 is an illustration of modules of a computer system used for processing a text content in accordance with the present invention.

FIG. 11 is a system diagram illustrating the general functional components and steps of one embodiment of the present invention.

In FIG. 11, a text content 1105, such as a document of any type, is obtained by the system from a computer storage 1100, or optionally from a user interface. The text content is then tokenized to produce a plurality of tokens by the tokenization module 1110, each of which can be a word or a phrase. In a general sense, a token can be an instance of a term that can have more than one token in the text content, for example, the word "good" may occur in more than one time in the content, and each occurrence is a token instance of the term "good".

Next, a linguistic analysis is performed by the linguistic processing module 1120 to identify the grammatical or semantic or contextual attributes of the tokens. In some embodiments, a parser of certain type can be used for the analysis. The parser can use a dictionary 1115 to aid its analysis. In some other embodiments, certain attributes can also be directly obtained by a dictionary lookup, such as the default connotation of a term, whether it is positive, negative, or neutral.

Then, the grammatical, semantic, contextual, or connotation attributes obtained from either the parser, or direct dictionary lookup can be used for determining the connotation or sentiment type of the text unit using the methods of the present invention by the processor 1130. And the results can be either text labeled with the connotation type, or extracted for statistic analysis and reports; or be output to either the user interface 1150 for display, or for storage.

As has been mentioned above, the examples of both the methods and the applications in various fields or for various purposes are for illustration purposes. The applicable cases of both the methods and the applications are not exhaustively listed. However, it should be understood that the principles, systems, methods, and applications disclosed in the present disclosure can be applied to similar cases that are not listed here; and can have variations in formats without deviating from the spirit of the present invention.

What is claimed is:

1. A method implemented on a computer comprising a processor, and for producing a sentiment marking for a multi-term text unit, the method comprising:

receiving a text unit comprising multiple terms, each term comprising a word or a phrase in a language;

identifying, in the text unit, a first term and a second term;

identifying a first connotation value associated with the first term, and a second connotation value associated with the second term, wherein the first connotation value and the second connotation value is either a positive value or a negative value each representing an opinion or sentiment type or value, wherein neither the first term nor the second term includes the grammatical negator or the negation word of the language, and when the language is the English language, neither the first term nor the second term includes a syntactically or grammatically defined negator or negation word comprising the word "not" or "no";

identifying a grammatical attribute associated with the first term or the second term, wherein the grammatical attribute includes at least the grammatical roles of a subject, an object, a head, a modifier, and parts of speech of a noun, a verb, a preposition, an adjective, and adverb; and associating the text unit as a whole with a derived connotation value based on the first connotation value and the second connotation value, and the grammatical attribute, wherein the derived connotation value is different from either the first connotation value or the second connotation value;

marking the text unit with the derived connotation value, or outputting the text unit as a text unit associated with the derived connotation value.

2. The method of claim 1, when the first connotation value is positive and the second connotation value is negative, or the first connotation value is negative and the second connotation value is positive, the derived connotation value is determined to be negative.

3. The method of claim 1, further comprising:

identifying a first grammatical attribute associated with the first term, and a second grammatical attribute associated with the second term; and determining the derived connotation value for the text unit as a whole based on the first grammatical attribute and the second grammatical attribute.

4. The method of claim 1, further comprising:

identifying a first semantic attribute associated with the first term and a second semantic attribute associated with the second term;

determining the derived connotation value for the text unit as a whole based on the first semantic attribute and the second semantic attribute, wherein the first semantic attribute and the second semantic attribute include a meaning carried by one or more words in the language.

5. The method of claim 4, when the first connotation value is positive and the second connotation value is negative, or the first connotation value is negative and the second connotation value is positive, the derived connotation value is determined to be positive.

6. The method of claim 1, wherein the first term is associated with the grammatical attribute of a verb, and the second term is associated with the grammatical attribute of a noun.

7. The method of claim 6, wherein the first term is associated with the grammatical attribute of a verb, and the second term is associated with the grammatical attribute of a noun that is an object of the verb.

8. The method of claim 6, wherein the first term is associated with the grammatical attribute of a verb, and the second term is associated with the grammatical attribute of a noun that is a subject of the verb.

9. The method of claim 1, wherein the first term is associated with the grammatical attribute of a noun and the second term is also associated with the grammatical attribute of a noun, wherein the first noun includes a noun that is derived from a verb, or is semantically related to an action.

10. The method of claim 9, wherein the text unit further comprises a third term associated with the parts of speech of a preposition, wherein the preposition connects the first noun and the second noun, wherein the text unit has a noun+preposition+noun structure.

11. The method of claim 1, wherein the first term is associated with the grammatical attribute of an adjective and the second term is associated with the grammatical attribute of a noun, wherein the text unit has an adjective+noun structure.

12. The method of claim 11, wherein the text unit further comprises a third term having the parts of speech of a preposition, wherein the preposition connects the adjective and the noun, wherein the text unit has an adjective+preposition+noun structure.

13. The method of claim 1, wherein the first term is associated with the grammatical attribute of an adjective, and the second term is associated with the grammatical attribute of a verb, wherein the adjective and the verb in the text unit is connected by a preposition in the form of adjective+preposition+verb.

14. The method of claim 1, wherein the first term is associated with the grammatical attribute of a subject, and the second term is associated with the grammatical attribute of an adjective predicative, wherein the subject and the adjective is connected by a linking verb in the form of subject+linking verb+adjective.

15. A method implemented on a computer comprising a processor, and for producing a sentiment marking for a multi-term text unit, the method comprising:

receiving a text unit comprising multiple terms, each term comprising a word or a phrase in a language;

identifying, in the text unit, a first term and a second term;

identifying a first connotation value associated with the first term, and a second connotation value associated with the second term, wherein the first connotation value and the second connotation value is either a positive or a negative value each representing an opinion or sentiment type or value, wherein the first connation value is different from the second connotation value, wherein neither the first term nor the second term includes the grammatical negator or the negation word of the language, when the language is the English language, neither the first term nor the second term includes a syntactically or grammatically defined negator or negation word comprising the word "not" or "no";

identifying a grammatical attribute associated with the first term, wherein the grammatical attribute includes at least the grammatical roles of a subject, an object, a head, a modifier, and parts of speech of a noun, a verb, a preposition, an adjective, and adverb;

associating the text unit as a whole with a derived connotation value based on the first connotation value and the grammatical attribute, independent of the second connotation value; and marking the text unit with the derived connotation value, or outputting the text unit as a text unit associated with the derived connotation value.

16. The method of claim 15, when the first connotation value is positive, the derived connotation value of the text unit as a whole is determined to be positive; when the first connotation value is negative, the derived connotation of the text unit as a whole is determined to be negative.

17. The method of claim 15, wherein the first term is a verb, and the second term is a noun that is an object of the verb, or the second term is a verb, and the first term is a noun that is a subject of the verb.

18. The method of claim 15, wherein the first term is a noun and the second term is also a noun; or wherein the text unit further comprises a third term associated with the parts of speech of a preposition, and the preposition connects the first term and the second term, and the text unit has a noun+preposition+noun structure; or wherein the first term is an adjective and the second term is a noun, and the text unit has an adjective+noun structure; or wherein the first term is an adjective and the second term is a noun, and the text unit further comprises a third term having the parts of speech of a preposition, and the preposition connects the adjective and the noun, and the text unit has an adjective+preposition+noun structure; or wherein the first term is an adjective and the second term is a verb, and the adjective and the verb in the text unit is connected by a preposition in the form of adjective+preposition+verb.

19. The method of claim 15, wherein the first term is associated with the grammatical attribute of a subject, and the second term is associated with the grammatical attribute of an adjective predicative, wherein the subject and the adjective is connected by a linking verb in the form of subject+linking verb+adjective.

20. A method implemented on a computer comprising a processor, and for producing a sentiment marking for a multi-term text unit, the method comprising:

receiving a text unit comprising multiple terms, each term comprising a word or a phrase in a language;

identifying, in the text unit, a first term and a second term in a scope of context, wherein the scope of context comprises two or more adjacent or syntactically or semantically related terms including a phrase or a sentence;

identifying a connotation value associated with the first term and the second term, wherein the connotation value associated with both the first term and the second term conveys a negative opinion or sentiment type or value, wherein neither the first term nor the second term includes the grammatical negator or the negation word of the language, and when the language is the English language, neither the first term nor the second term includes a syntactically or grammatically defined negator or negation word comprising the word "not" or "no";

associating the text unit as a whole with a derived connotation value based on the connotation value that is associated with both the first term and the second term, wherein the derived connotation value is determined to be positive when the connotation value that is associated with both the first term and the second term is negative;

marking the text unit with the derived connotation value, or outputting the text unit as a text unit associated with the derived connotation value.

\* \* \* \* \*